(12) United States Patent
Park et al.

(10) Patent No.: US 10,391,564 B2
(45) Date of Patent: Aug. 27, 2019

(54) HYBRID CUTTING APPARATUS AND METHOD OF CUTTING GROOVE USING THE SAME

(71) Applicants: KOREA INSTITUTE OF MACHINERY & MATERIALS, Daejeon (KR); GOTTFRIED WILHELM LEIBNIZ UNIVERSITAT HANNOVER, Hannover (DE)

(72) Inventors: Jong-Kweon Park, Daejeon (KR); Berend Denkena, Wedemark (DE); Oliver Bertram, Lehrte (DE); Dominik Dahlmann, Hannover (DE)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 0 days.

(21) Appl. No.: 15/573,991

(22) PCT Filed: Sep. 9, 2016

(86) PCT No.: PCT/KR2016/010199
§ 371 (c)(1),
(2) Date: Nov. 14, 2017

(87) PCT Pub. No.: WO2017/043931
PCT Pub. Date: Mar. 16, 2017

(65) Prior Publication Data
US 2018/0290216 A1    Oct. 11, 2018

(30) Foreign Application Priority Data

Sep. 10, 2015  (KR) .................. 10-2015-0128161
Apr. 14, 2016  (KR) .................. 10-2016-0045508

(51) Int. Cl.
*B23B 29/034*    (2006.01)
*B23B 41/12*    (2006.01)
(Continued)

(52) U.S. Cl.
CPC ........ *B23B 41/12* (2013.01); *B23B 29/03428* (2013.01); *B23B 29/03485* (2013.01);
(Continued)

(58) Field of Classification Search
CPC ..... Y10T 82/12; Y10T 82/122; Y10T 82/125; B23B 29/034; B23B 29/03432;
(Continued)

(56) References Cited

U.S. PATENT DOCUMENTS 3,405,049 A * 10/1968 Czubak ............. B23B 29/03446
204/217
4,463,490 A * 8/1984 Saito ...................... B24B 33/02
29/558
(Continued)

FOREIGN PATENT DOCUMENTS

DE    2014690 A1    11/1971
EP    1070563 A1    1/2001
(Continued)

OTHER PUBLICATIONS

Machine Translation, Japan Patent Document, JP 2009-248292A, Kume et al. (Year: 2009).*
(Continued)

*Primary Examiner* — Sunil K Singh
*Assistant Examiner* — Chwen-Wei Su
(74) *Attorney, Agent, or Firm* — Hauptman Ham, LLP

(57) ABSTRACT

A hybrid cutting apparatus and a method of cutting a groove are provided.
The hybrid cutting apparatus includes: a main body that is connected with a rotation shaft of a machine tool; a grooving
(Continued)

tool that is coupled to one side of the main body and for forming a groove at an interior circumference of a workpiece; and a tool position control means that controls a position of the grooving tool to correspond to a cutting surface position of the workpiece.

17 Claims, 15 Drawing Sheets

(51) Int. Cl.
    *B23P 13/02*     (2006.01)
    *B23D 79/02*     (2006.01)
    *B23D 79/04*     (2006.01)
    *B23P 17/02*     (2006.01)
    *B23Q 5/20*     (2006.01)
    *B23Q 15/22*     (2006.01)
    *B23Q 17/22*     (2006.01)

(52) U.S. Cl.
    CPC .............. *B23D 79/02* (2013.01); *B23D 79/04* (2013.01); *B23P 13/02* (2013.01); *B23P 17/02* (2013.01); *B23Q 5/20* (2013.01); *B23Q 15/22* (2013.01); *B23Q 17/22* (2013.01); *B23B 29/03442* (2013.01); *B23B 2229/16* (2013.01); *B23B 2260/076* (2013.01); *B23B 2260/108* (2013.01); *B23B 2260/128* (2013.01); *Y10T 82/125* (2015.01)

(58) Field of Classification Search
    CPC ........ B23B 29/03439; B23B 29/03442; B23B 29/0346; B23B 29/03478; B23B 29/03482; B23B 29/03485; B23B 2215/242; B23B 2220/123; B23B 41/12; B24B 33/02; B24B 33/0877; B24B 33/087
See application file for complete search history.

(56) References Cited

U.S. PATENT DOCUMENTS

| | | | |
|---|---|---|---|
| 4,605,346 A | | 8/1986 | Trevarrow |
| 7,862,404 B2 * | | 1/2011 | Takashima ................ B23P 9/02 451/51 |
| 8,555,757 B2 * | | 10/2013 | Kress ................ B23B 29/03478 408/152 |
| 2013/0209012 A1 * | | 8/2013 | Rittmann .......... B23B 29/03492 384/129 |

FOREIGN PATENT DOCUMENTS

| | | |
|---|---|---|
| EP | 2283956 B1 | 4/2013 |
| JP | 56-119365 A | 9/1981 |
| JP | H4-365503 A | 12/1992 |
| JP | 2001-353655 A | 12/2001 |
| JP | 2009-248292 A | 10/2009 |
| JP | 2011-11293 A | 1/2011 |
| KR | 10-1341117 B1 | 12/2013 |

OTHER PUBLICATIONS

International Search Report dated Dec. 22, 2016 corresponding to International Application No. PCT/KR2016/010199.
Supplementary European Search Report for corresponding European application No. 16844747.2 dated Mar. 20, 2019.

* cited by examiner

HYBRID CUTTING APPARATUS AND METHOD OF CUTTING GROOVE USING THE SAME

CROSS REFERENCE TO RELATED APPLICATION

This application claims the priority of Korean Patent Application No. 10-2015-0128161, filed on Sep. 10, 2015 and Korean Patent Application No. 10-2016-0045508, filed on Apr. 14, 2016, in the Korean Intellectual Property Office, the disclosure of which is incorporated herein by reference. Further, this application is the National Phase application of International Application No. PCT/KR2016/010199 filed Sep. 9, 2016, which designates the United States.

TECHNICAL FIELD

The present invention relates to a hybrid cutting apparatus and a method of cutting a groove using the same that can accurately cut an oil groove in a cylinder bore, which is a workpiece.

BACKGROUND ART

A cylinder bore surface for an engine secures a predetermined level of surface roughness through a honing processing. On the honing processed cylinder bore surface, a network-shaped mesh pattern is formed, and an oil film is formed on the bore surface by such a mesh pattern to perform a function of minimizing a friction when performing a piston movement.

When a piston movement is continuously performed, a mesh pattern may be deformed, such deformation causes an oil to separate from the cylinder bore surface when performing a piston movement and thus a friction increases between a piston ring and the cylinder bore surface, thereby largely deteriorating engine efficiency.

The above-described problem may be solved by additionally forming an oil groove (e.g., 10 μm or less) that is charged with oil on the honing processed cylinder bore surface. A method of processing an oil groove that is formed on the cylinder bore surface is generally classified into a laser processing method and a mechanical processing method.

The laser processing method is a method of processing an oil groove on the cylinder bore surface using pulse laser after a honing processing, and in such a laser processing method, a processing equipment is expensive and because a size and volume thereof are large, there is a problem that equipment installation is not easily, and there is a problem that it is very difficult to process the oil groove in a constant depth because of a micro output change of laser beam.

The mechanical processing method is a method of physically forming an oil groove on the cylinder bore surface by inserting a cutting tool into the honing processed cylinder bore and contacting the cutting tool with the honing processed cylinder bore. When using such a mechanical processing method, in order to form a groove of a constant depth on an entire surface of the cylinder bore, it is required to accurately correspond a rotation axis of the cutting tool with a central axis of the cylinder bore.

For the above-described axis position setting, a measurement equipment is introduced and a measurement process should be performed. This becomes a factor that increases an entire processing time. Further, even if an axis position is accurately measured with the measurement equipment and a processing is performed, a depth (10 μm or less) of an oil groove that should be formed is very minute and thus when measurement is minutely incorrect, there is a problem that a depth of the oil groove that is formed on an entire surface of the cylinder bore is not constantly formed.

DISCLOSURE

Technical Problem

The present invention has been made in an effort to provide a hybrid cutting apparatus having advantages of being capable of performing a precise grooving processing while a position of a grooving tool is automatically proportionally controlled according to a displacement of a cutting surface.

The present invention has been made in an effort to further provide a hybrid cutting apparatus that can perform together a honing processing and a groove processing because a honing tool and a grooving tool are integrally formed.

The present invention has been made in an effort to further provide a method of cutting a groove using the hybrid cutting apparatus.

Technical Solution

An exemplary embodiment of the present invention provides a hybrid cutting apparatus including: a main body that is connected with a rotation shaft of a machine tool; a grooving tool that is coupled to one side of the main body and for forming a groove at an interior circumference of a workpiece; and a tool position control means that controls a position of the grooving tool to correspond to a cutting surface position of the workpiece.

The tool position control means may include a moving unit that moves a grooving tool such that a cutting tip of the grooving tool arrives at a groove processing depth of the workpiece.

The moving unit may include a driving motor; and a cam member having one end that is concentrically connected with a shaft of the driving motor and the other end that is connected with the grooving tool to be eccentric from the shaft of the driving motor.

The hybrid cutting apparatus may further include a harmonic drive that is installed between the driving motor and the cam member to decelerate rotation power that is transferred from the driving motor to the cam member.

The moving unit may include a piezo actuator.

The tool position control means may further include a distance sensor for measuring a distance between a cutting tip of the grooving tool and the workpiece cutting surface; and a control unit that automatically controls a level in which the moving unit moves the grooving tool according to a value that is measured by the distance sensor.

The distance sensor may detect whether the rotation shaft corresponds with the center of the workpiece.

The tool position control means may include a first moving unit that moves a cutting tip of the grooving tool from a current position to a primary setting position adjacent to the workpiece; and a second moving unit that moves the cutting tip of the grooving tool from the primary setting position to a processing depth of the groove.

The hybrid cutting apparatus may further include a honing tool that is disposed at one side of the grooving tool and for a honing processing of an interior circumference of the workpiece.

The honing tool may be connected in a line with the grooving tool and be fastened to the main body together with the grooving tool by a common housing.

The honing tool may include a forward and backward shaft that is installed to perform a forward and backward movement in an axial direction; a grindstone holder that is radially disposed at the outside of the forward and backward shaft and that is disposed to elastically press toward the forward and backward shaft by a ring spring; and a grindstone that is installed at an outer surface of the grindstone holder.

The forward and backward shaft may be formed in a corn shape having an exterior diameter gradually decreasing as advancing to the front end, and an inner surface of the grindstone holder that comes in close contact with the forward and backward shaft has an inclined surface corresponding to the corn shape.

The forward and backward shaft may be moved by hydraulic pressure of a hydraulic plunger that is provided within the main body.

When hydraulic pressure of the hydraulic plunger is reduced or blocked, the forward and backward shaft may move backward by an elastic pressing force of the ring spring.

At a contact surface of the forward and backward shaft and the grindstone holder, a latch and a counterpart latch for enabling the forward and backward shaft to stop at a predetermined point when the forward and backward shaft is moved backward may be formed.

Another embodiment of the present invention provides a method of cutting a groove at a cylinder bore surface using the hybrid cutting apparatus including: installing a grooving tool within a cylinder bore; measuring a distance between a cutting tip of the grooving tool and the cylinder bore; setting a moving position of the grooving tool in proportion to the measured distance and moving the grooving tool to the predetermined moving position; and processing a groove in the cylinder bore by the grooving tool by rotating the hybrid cutting apparatus.

The setting of a moving position may include a primary moving step of moving the grooving tool to a primary setting position adjacent to the cylinder bore; and a secondary moving step of moving a cutting tip of the grooving tool from the primary setting position to the processing depth of the groove.

The method may further include, before the processing of a groove, deriving an optimal processing result value according to a condition value for processing the groove to reflect the processing result value to the processing of a groove.

The method may further include, before the setting of a moving position, adjusting a position of the rotation central axis, when a rotation central axis of the cutting apparatus is inclined.

Advantageous Effects

According to an exemplary embodiment of the present invention, even if a cylinder bore, which is a workpiece is not a circle or even if a grooving tool is not accurately entered at the center of the cylinder bore, by enabling a position of a grooving tool to be proportionally controlled according to a change of a distance between the front end of a tip and an inner surface of the cylinder bore, a precise and effective grooving processing can be performed.

Further, according to an exemplary embodiment of the present invention, by integrally forming a honing tool and a grooving tool, because a honing work and a grooving work can be continuously performed without replacement of the tool, work efficiency can be enhanced and productivity can be improved.

MODE FOR INVENTION

Figure 1:
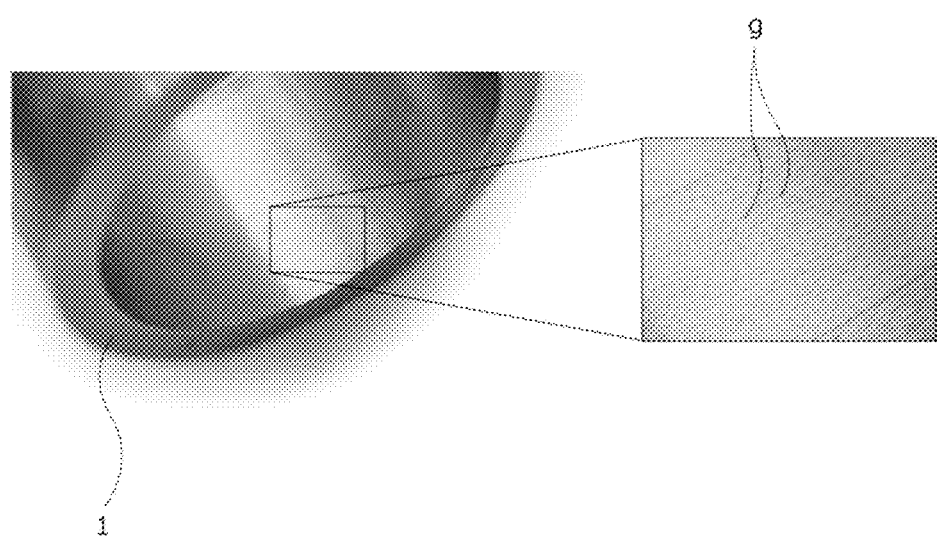
FIG. 1 illustrates a workpiece that is processed by a hybrid cutting apparatus according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "indirectly coupled" to the other element through a third element. In addition, unless explicitly described to the contrary, the word "comprise" and variations such as "comprises" or "comprising", will be understood to imply the inclusion of stated elements but not the exclusion of any other elements.

Terms used in the present invention are defined in consideration of a function in the present invention and may be changed according to an intention or a practice of a user or an operator, and a definition of such terms should be analyzed as a meaning and a concept corresponding to technical contents of the present invention.

Terms selected in the following exemplary embodiment are used for distinguishing one constituent element from other constituent elements, and the constituent elements are not limited by the terms. Hereinafter, detailed descriptions of well-known functions and structures incorporated herein may be omitted to avoid obscuring the subject matter of the present invention.

Hereinafter, exemplary embodiments of the present invention will be described.

First Exemplary Embodiment

Figure 2:
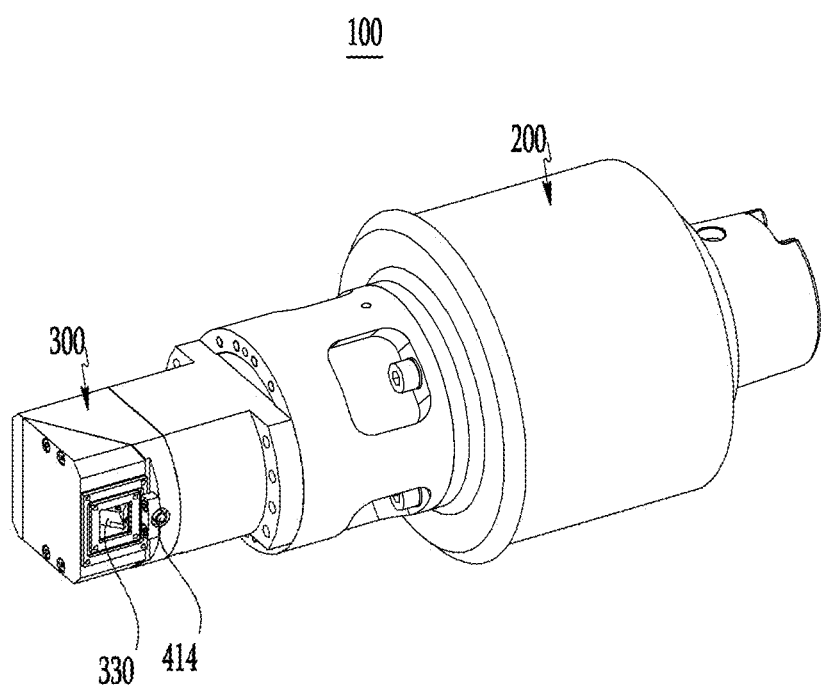
FIG. 2 is a perspective view of a hybrid cutting apparatus according to a first exemplary embodiment of the present invention.
Figure 3:
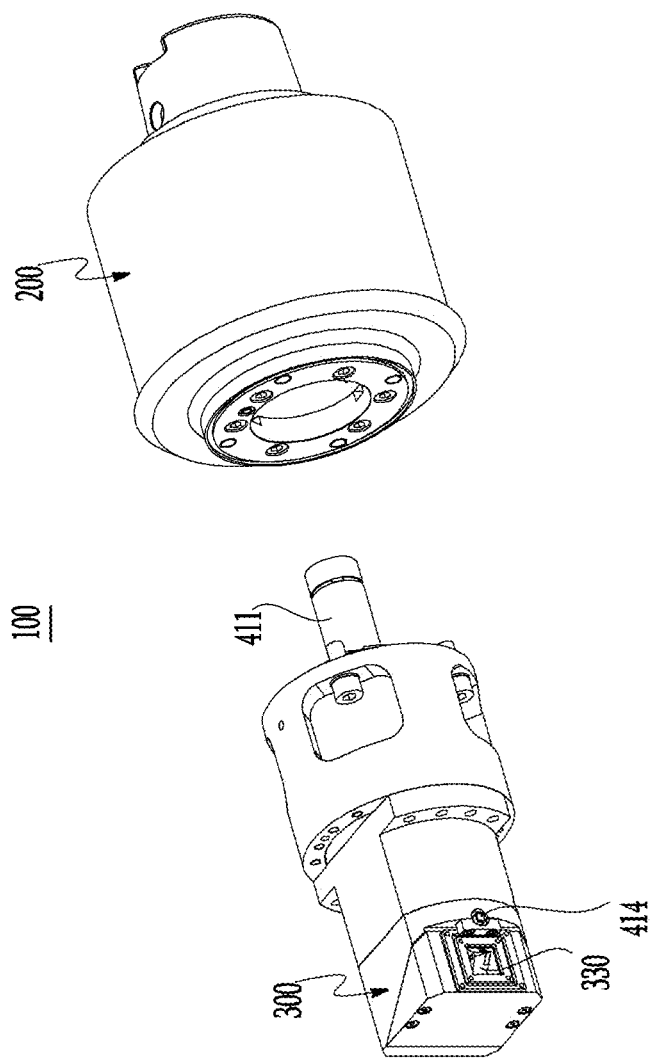
FIG. 3 is an exploded perspective view of a hybrid cutting apparatus according to a first exemplary embodiment of the present invention.
Figure 4:
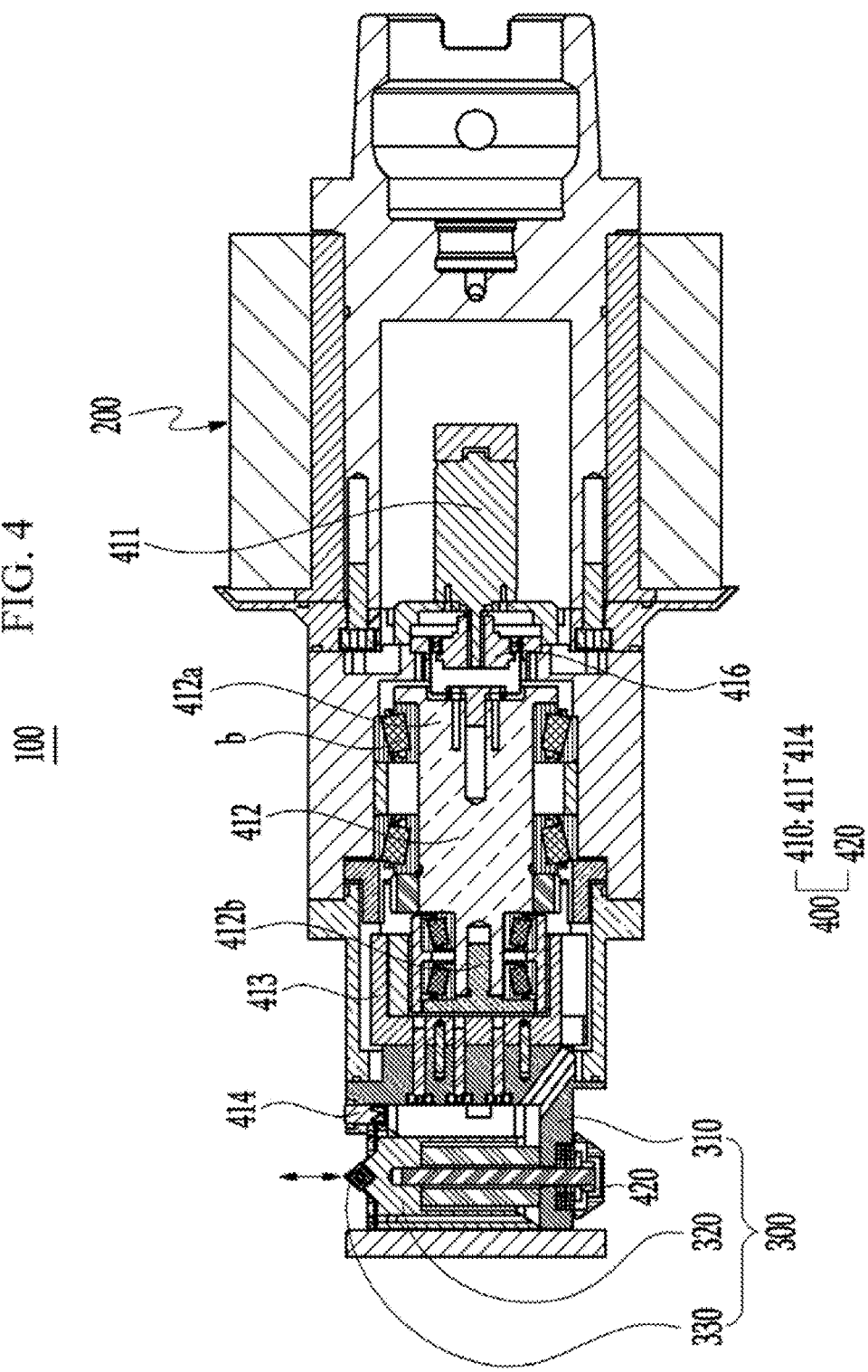
FIG. 4 is an assembled cross-sectional view of a hybrid cutting apparatus according to a first exemplary embodiment of the present invention.
Figure 5:
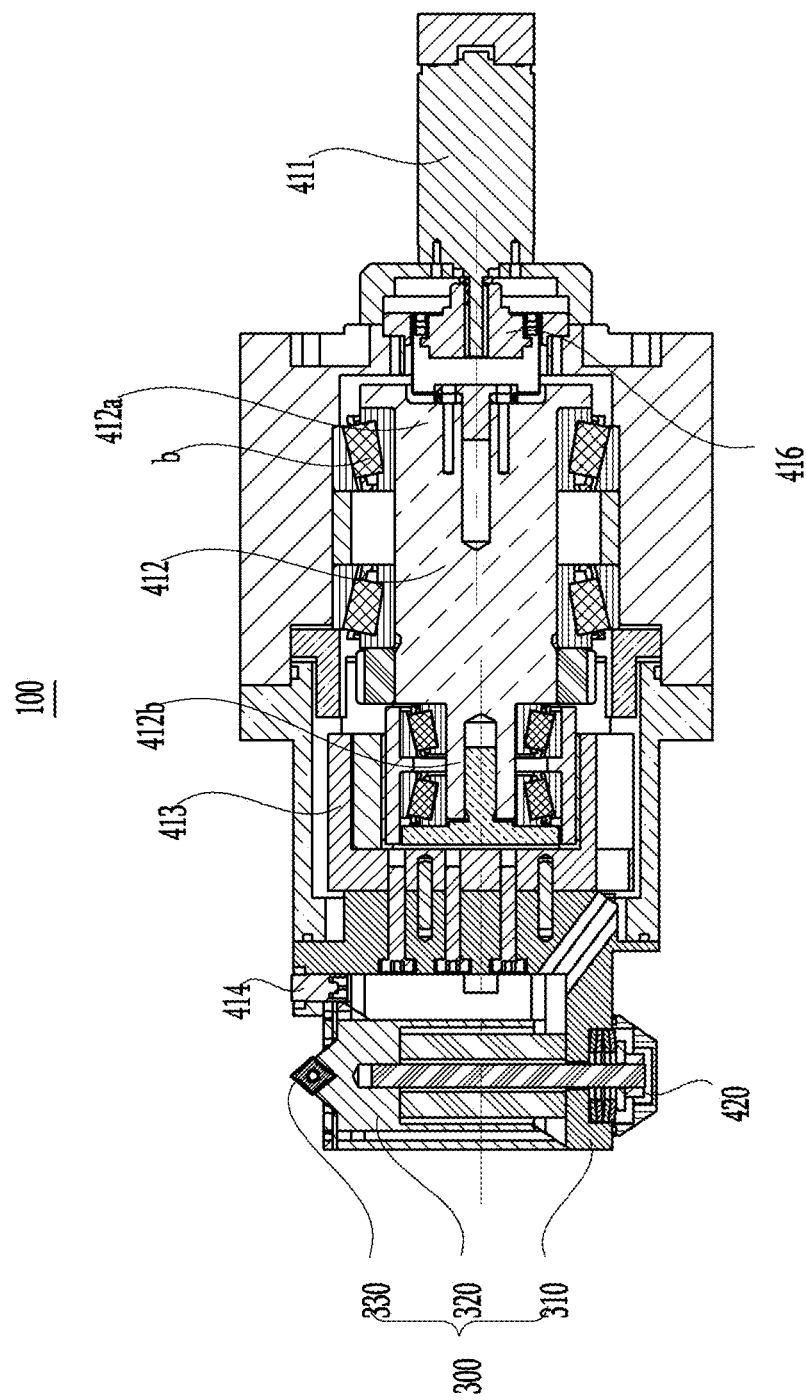
FIG. 5 is a partially cross-sectional view of a hybrid cutting apparatus according to a first exemplary embodiment of the present invention.

FIG. 1 illustrates a workpiece that is processed by a hybrid cutting apparatus according to an exemplary embodiment of the present invention, FIG. 2 is a perspective view of a hybrid cutting apparatus according to a first exemplary embodiment of the present invention, FIG. 3 is an exploded perspective view of a hybrid cutting apparatus according to a first exemplary embodiment of the present invention, FIG. 4 is an assembled cross-sectional view of a hybrid cutting apparatus according to a first exemplary embodiment of the present invention, and FIG. 5 is a partially cross-sectional view of a hybrid cutting apparatus according to a first exemplary embodiment of the present invention.

Referring to FIGS. 1 to 5, a hybrid cutting apparatus 100 according to a first exemplary embodiment may include a main body 200, a grooving tool 300, and a tool position control means 400.

The main body 200 is coupled to a rotation shaft (not shown) of a machine tool to rotate and is a holder to which the grooving tool 300 is coupled. In this specification, the rotation shaft of the machine tool may mean a spindle or a main shaft.

As shown in FIG. 1, the grooving tool 300 performs a cutting processing of a groove g that performs a function of an oil pocket in a cylinder bore 1.

As shown in FIGS. 4 and 5, the grooving tool 300 may be configured with a tool support 310, a tool holder 320 that is installed to move forward and backward in the tool support 310, and a cutting tip 330 that performs a cutting processing of the groove g in the cylinder bore 1 with installed at one end of the tool holder 320.

As shown in FIGS. 4 and 5, the tool position control means 400 performs a function of controlling a level that is protruded to the outside of the grooving tool 300 to correspond to a cutting surface position of the cylinder bore 1 and may include a first moving unit 410 and a second moving unit 420.

Figure 6:
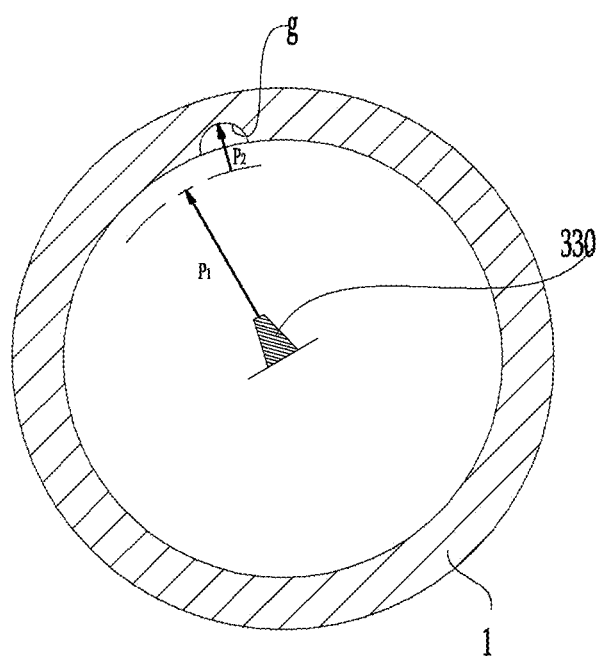
FIG. 6 is a diagram illustrating a position control of a grooving tool for a cylinder bore.

FIG. 6 is a diagram illustrating a position control of a grooving tool for a cylinder bore. As shown in FIG. 6, the first moving unit 410 performs a function of moving the front end of the cutting tip 330 of the grooving tool 300 from a current position to a primary setting position P1 adjacent to the cylinder bore 1, and the primary setting position P1 means a position that is separated by a predetermined gap from a processing surface of the cylinder bore 1.

The first moving unit 410 may be configured with a driving motor 411 that is received in the main body 200, a cam member 412 having one end that is concentrically connected with a shaft of the driving motor 411 and the other end opposite to the one end and that is eccentric from the shaft of the driving motor 411, and a connection body 413 that performs a linear reciprocating motion according to a cam motion of the other end with connected to slip by bearings b with the other end of the cam member 412 and that is connected with the grooving tool 300.

Here, in the connection body 413, a distance sensor 414 for measuring a distance between the front end of the cutting tip 330 of the grooving tool 300 and the cylinder bore 1 may be installed.

Therefore, the grooving tool 300 may be moved to the primary setting position P1 through a measurement value of the distance sensor 414. In more detail, when the cam member 412 rotates by the driving motor 411, the other end 412b of the cam member 412 performs an eccentric rotation, both sides of a connection body 413 that is connected with the other end 412b of the cam member by a bearing b are in a lock state by a housing 600 and thus the connection body 413 performs a linear motion in a unlocked direction, and the grooving tool 300 that is coupled to the connection body 413 may be moved to the primary setting position P1 while performing a linear motion, as in the connection body 413.

A harmonic drive 416 for decelerating rotation power that is transferred from the driving motor 411 to the cam member 412 may be installed between the driving motor 411 and the cam member 412.

Figure 7:
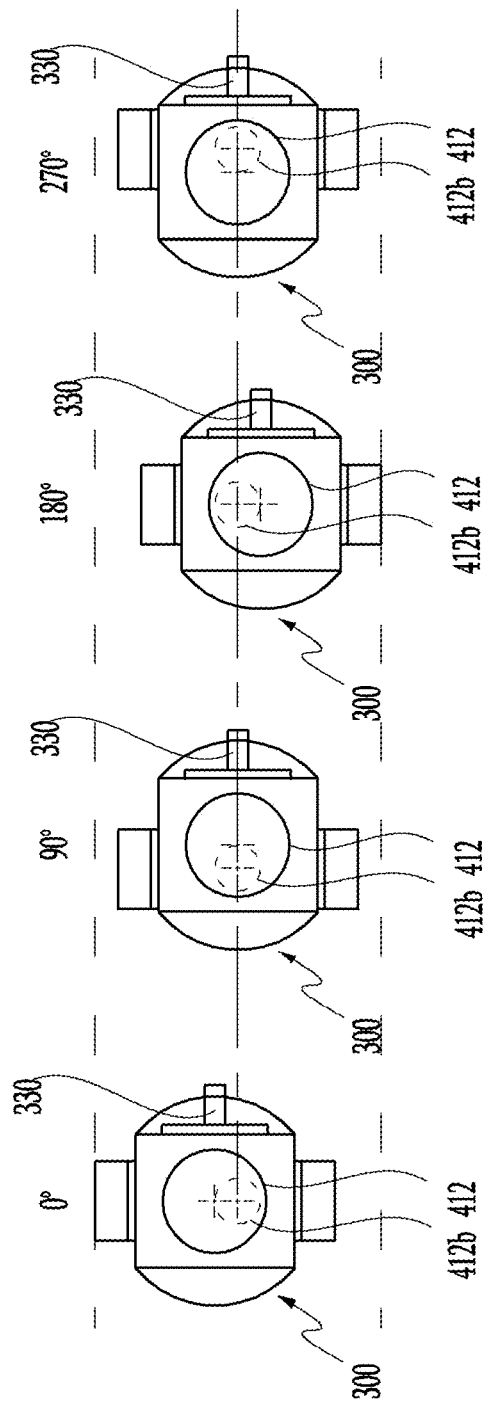
FIG. 7 is a diagram illustrating a position control of a grooving tool by a cam member.

FIG. 7 is a diagram illustrating a position control of a grooving tool by a cam member. Here, FIG. 7 illustrates a position change of the grooving tool 300 on an angle basis when the cam member 412 rotates by 360° by the driving motor 411. As shown in FIG. 7, when the other end 412b of the cam member 412 rotates by 90° from an initial state, the cutting tip 330 of the grooving tool 300 is largest moved to the outside, and when the other end 412b of the cam member 412 rotates by 270° from an initial state, the cutting tip 330 is in a most retreated state. Therefore, when adjusting a rotation angle of the cam member 412, a moving level of the cutting tip 330 may be adjusted and thus a position may be adjusted to correspond to an interior diameter size of the cylinder bore 1. In this case, because a distance between the front end of the cutting tip 330 and the cylinder bore 1 may be measured through a measurement value of the distance sensor 414, a moving level of the grooving tool 300 may be adjusted.

As shown in FIG. 6, by moving the cutting tip 330 of the grooving tool 300 from the primary setting position P1 to a processing depth P2 of the groove g, the second moving unit 420 performs a function of cutting.

The second moving unit 420 may include, for example, a piezo actuator. While maintaining the tool support 310 of the grooving tool 300, the piezo actuator performs a function of minutely moving only the tool holder 320 including the cutting tip 330.

The reason of moving the grooving tool 300 over two steps is that a moving length of the piezo actuator is extremely minute. Therefore, a large distance movement, i.e., a first movement of the grooving tool 300 should receive assistance of the first moving unit 410.

Because a heat may occur in the piezo actuator while minutely moving the tool holder 320, a heat emission means may be provided in the tool holder 320 in order to emit the generated heat to the outside. For example, in the tool holder 320, a hole that communicates with the outside may be formed, and because air communicates through a hole, a heat that is generated in the piezo actuator may be emitted to the outside. However, a heat emission means is not limited thereto and in order to emit a heat that is generated in the piezo actuator to the outside, various configurations may be formed in addition to a hole that communicates with air.

The tool position control means 400 may further include a control unit 430 that automatically controls the first moving unit 410 and the second moving unit 420.

Figure 8:
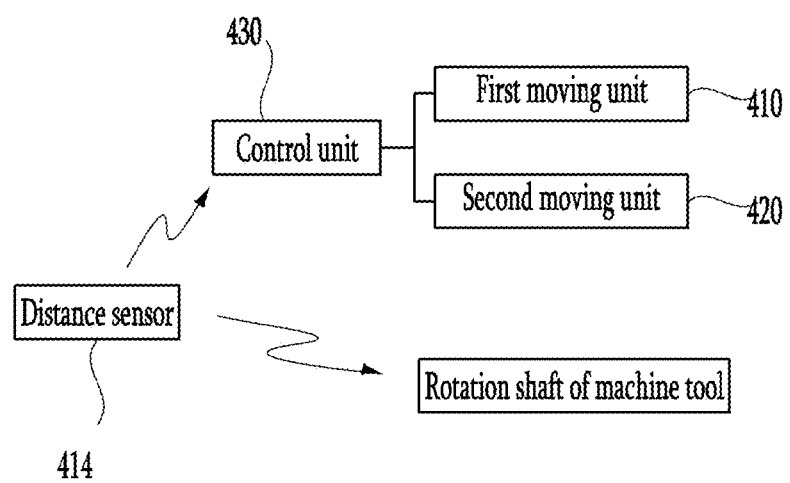
FIG. 8 is a block diagram illustrating a control unit.

FIG. 8 is a block diagram illustrating a control unit. As shown in FIG. 8, the control unit 430 performs a function of primarily controlling to move the front end of the cutting tip 330 of the grooving tool 300 to the primary setting position P1 by the first moving unit 410 based on a distance measurement value between the front end of the cutting tip 330 of the grooving tool 300 and the cylinder bore 1, which is received from the distance sensor 414, and a function of secondarily automatically controlling to move to a processing depth of the groove from the primary setting position, which is a secondary setting position P2 by the second moving unit 420 based on a measurement value that is measured in real time by the distance sensor 414.

As in the foregoing description, the tool position control means 400 may move the entire grooving tool 300 until the front end of the grooving tool 300 arrives at a processing depth of the groove g of the cylinder bore 1 with only one moving unit instead of the first and second moving units 410 and 420.

In the foregoing hybrid cutting apparatus, the rotation central axis (the central line of the rotation shaft of a machine tool, hereinafter, referred to as a rotation central axis) may deviate from a workpiece, for example, the central line of the cylinder bore 1. For example, when the machine tool is a cantilever type machine tool, as a cutting processing is performed, the rotation shaft is inclined by a load of the cutting apparatus and thus the central line of the rotation shaft may not correspond with the central line of the workpiece. Referring to FIG. 8, in such a case, a tilt of a rotation shaft may be detected through a measurement value of the distance sensor 414, and a position of the rotation central axis of the hybrid cutting apparatus, i.e., a rotation shaft of a machine tool that rotates the cutting apparatus may be adjusted through detected information.

In more detail, when the rotation central axis of the cutting apparatus deviates from the central line of the workpiece, if the cutting apparatus rotates, a distance value that is measured by the distance sensor 414 is changed instead of being constant. In this case, the distance sensor 414 may measure a distance from the rotation central axis of the cutting apparatus to the cutting surface of the workpiece and may be connected with a rotation shaft adjustment means of the machine tool. Accordingly, by adjusting a position of the rotation shaft of the machine tool based on a distance value that is measured by the distance sensor 414, the rotation central axis of the cutting apparatus may be adjusted to approach to the central line of the workpiece.

In this case, the distance sensor 414 may be configured with one, as shown in FIG. 8. For example, an encoder may be provided in the main body 200, and the distance sensor 414 may measure a distance from a rotation central axis of the cutting apparatus to a cutting surface of the workpiece while detecting an angle of a rotation shaft rotating by the encoder. The distance sensor 414 may detect through a measurement value whether the rotation central axis of the cutting apparatus is deviated from a central line of the workpiece and whether the rotation central axis of the cutting apparatus is inclined. However, a method of detecting through the distance sensor 414 whether the rotation central axis of the cutting apparatus is inclined is not limited thereto, and a plurality of distance sensors 414 may be configured. For example, when two distance sensors are disposed in parallel on the rotation central axis of the cutting apparatus, if the rotation central axis is inclined, measurement values of two distance sensors become different, and by calculating two measurement values, an inclined angle of the rotation shaft may be calculated. Thereby, by adjusting the rotation shaft of the machine tool, the rotation central axis of the cutting apparatus may be adjusted to approach to the central line of the workpiece. Further, in another form, as shown in FIGS. 4 and 5, a distance sensor is installed at the outside of the connection body 413, but when two distance sensors are disposed in opposite directions in a direction vertical to the rotation central axis of the cutting apparatus, if the rotation central axis of the cutting apparatus is inclined, measurement values of two distance sensors 414 become different, and an inclined level of the rotation central axis of the cutting apparatus may be calculated through a difference between two measurement values. Thereby, by adjusting the rotation shaft of the machine tool, the rotation central axis of the cutting apparatus may be adjusted to approach to the central line of the workpiece.

In this way, a hybrid cutting apparatus according to a first exemplary embodiment of the present invention may adjust a moving distance of a grooving tool of the cutting apparatus through the distance sensor 414, and the distance sensor 414 may detect that the rotation central axis of the cutting apparatus deviates from the central line of the workpiece to be inclined using a measurement value of the distance sensor 414, and by adjusting a position of the rotation central axis of the cutting apparatus, i.e., the central shaft of the machine tool using measurement value information of the distance sensor 414, a processing failure can be prevented.

Hereinafter, a method of controlling the hybrid cutting apparatus according to the foregoing first exemplary embodiment will be described.

Figure 9:
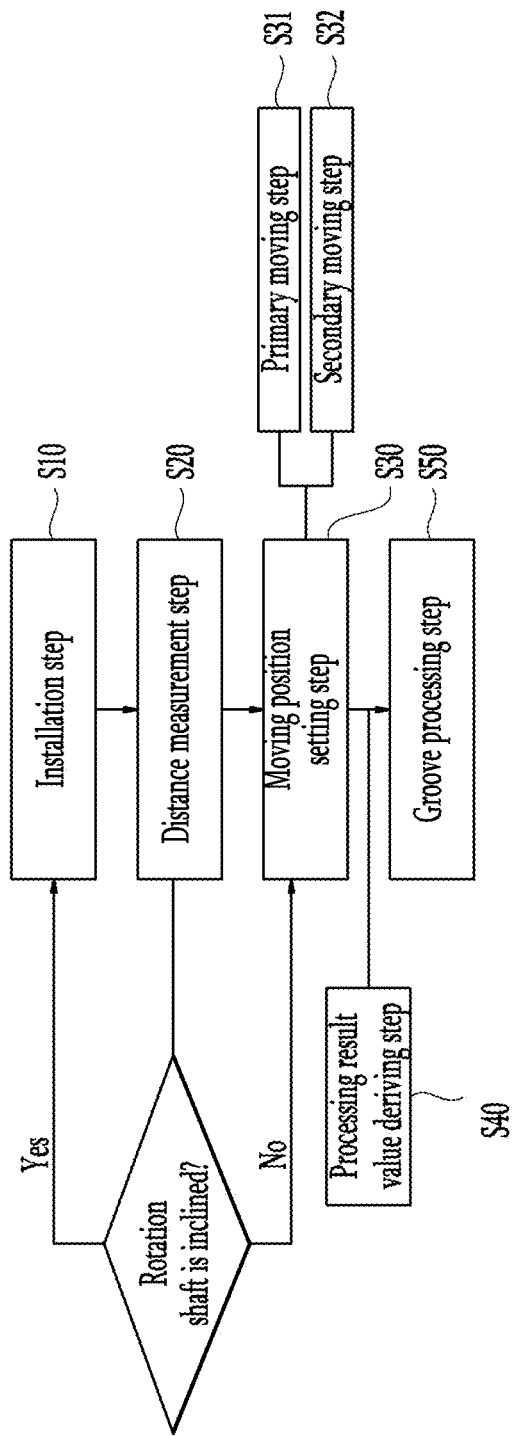
FIG. 9 is a flowchart illustrating a method of cutting a groove by a hybrid cutting apparatus according to a first exemplary embodiment of the present invention.

FIG. 9 is a flowchart illustrating a method of cutting a groove by a hybrid cutting apparatus according to a first exemplary embodiment of the present invention.

Referring to FIG. 9, at a first step, a grooving tool of a hybrid cutting apparatus is installed within a cylinder bore (S10).

At the first step, the grooving tool 300 is installed to accurately enter at the center of the cylinder bore 1, which is a workpiece. In this case, a central line of the cylinder bore 1 and a rotation central axis of the hybrid cutting apparatus 100 are arranged on a straight line.

At a second step, a distance between the front end of the grooving tool of the hybrid cutting apparatus and the cylinder bore 1 is measured (S20).

At the second step, by installing the distance sensor 414 on a predetermined portion, for example, the connection body 413 of the hybrid cutting apparatus 100, a distance between the front end of the grooving tool 300 and the cylinder bore 1 is measured and a measurement value is transmitted to the control unit 430.

At the second step, because it may be detected whether the rotation shaft of the machine tool is inclined through a measurement value of the distance sensor 414, when the rotation shaft is inclined, the process returns to the first step and the rotation shaft may be adjusted. That is, the first step includes a process of adjusting a rotation shaft. In this case, when the rotation shaft is not inclined, the following third step may be performed.

At a third step, a moving position of the grooving tool is set in proportion to a measured distance, and the grooving tool 300 is moved to a predetermined moving position (S30).

At the third step, for example, when it is assumed that the cylinder bore 1 is an oval, if the cutting tip 330 of the grooving tool 300 advances toward a long diameter direction, a distance to a setting point adjacent to the cylinder bore 1 is relatively large, but if the cutting tip 330 of the grooving tool 300 advances toward a short diameter direction, a distance to a setting point adjacent to the cylinder bore 1 is relatively small.

Therefore, in a long diameter direction, a moving length of the grooving tool 300 should be extended, and in a short diameter direction, the grooving tool 300 should be relatively shortly moved, and at the third step, as in the foregoing example, a position of the grooving tool 300 is proportionally controlled according to a distance between the grooving tool 300 and the cylinder bore 1.

Here, a moving operation of the grooving tool 300 may be divided into a primary moving step S31 of moving the entire grooving tool 300 from a current position to the primary setting position P1 adjacent to the cylinder bore 1 and a secondary moving step S32 of moving a cutting tip of the grooving tool 300 from the primary setting position P1 to a processing depth of the groove g.

At a fourth step, by rotation the hybrid cutting apparatus, a groove is processed in the cylinder bore by the grooving tool (S50).

At the fourth step, in a process of rotating the hybrid cutting apparatus 100, a precision processing is available by processing the groove g while changing a position of the grooving tool 300 to correspond to a distance change between the grooving tool 300 and the cylinder bore 1, as described at the foregoing third step.

Before the fourth step, the process may further include a processing result value deriving step S40 of deriving an optimal processing result value according to a condition value for processing the groove, and a derived processing result value may be reflected to the groove processing step.

Figure 10:
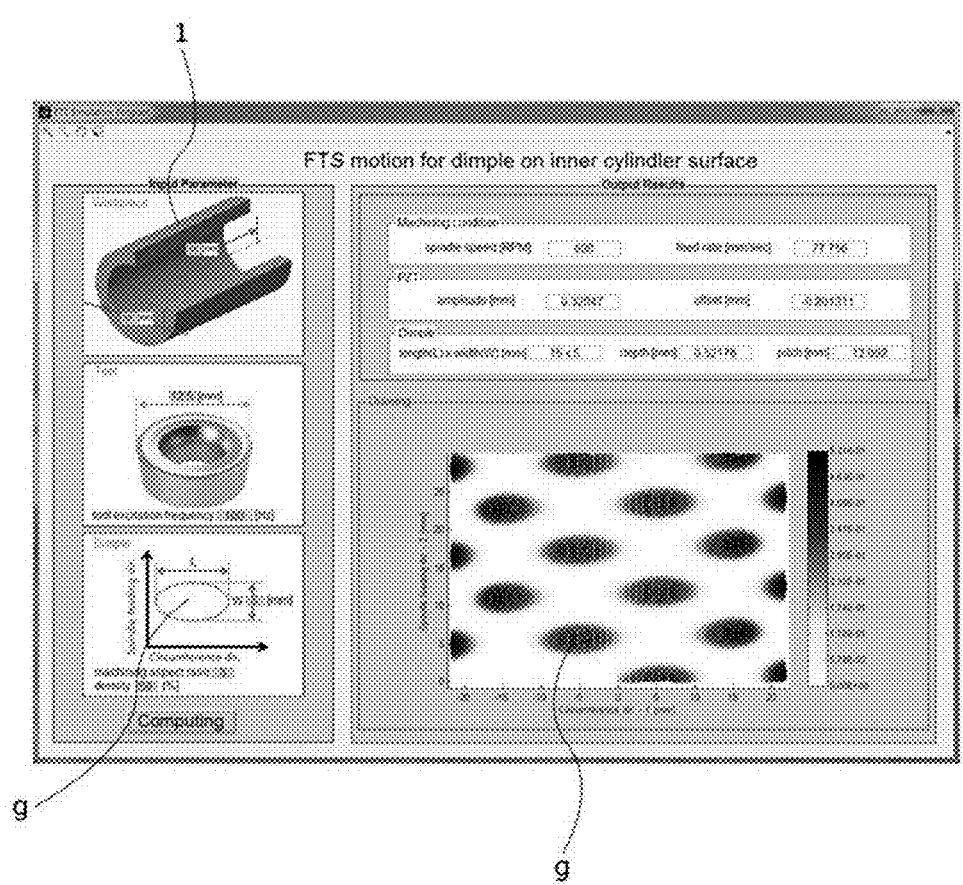
FIG. 10 is a diagram illustrating a processing result value deriving step in a groove cutting method by a hybrid cutting apparatus according to a first exemplary embodiment of the present invention.

In other words, as shown in FIG. 10, at the processing result value deriving step, when inputting a condition value for a groove processing using a computer or mobile exclusive program, a final processing result value is automatically calculated and derived and thus a groove is processed using a deriving value.

For reference, a factor of the condition value may be configured with an interior diameter and length of the cylinder bore 1, a diameter of the cutting tip 330, a forward and backward speed of a piezo actuator, width and height lengths and distribution density of the groove g, and a factor of a result value may be configured with a forward and backward speed of the grooving tool 300, an amplitude and initial position of the piezo actuator, and a size, depth, and pitch of the groove, but is not limited thereto.

Second Exemplary Embodiment

Figure 11:
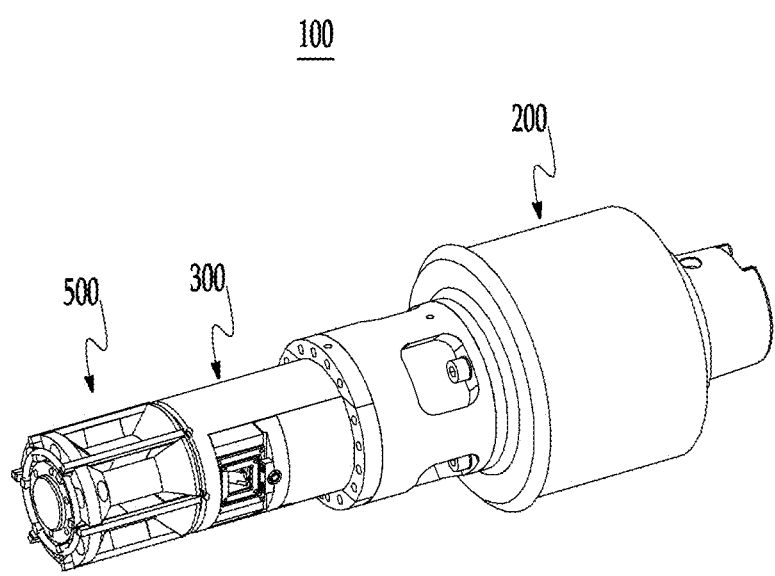
FIG. 11 is a perspective view of a hybrid cutting apparatus according to a second exemplary embodiment of the present invention.
Figure 12:
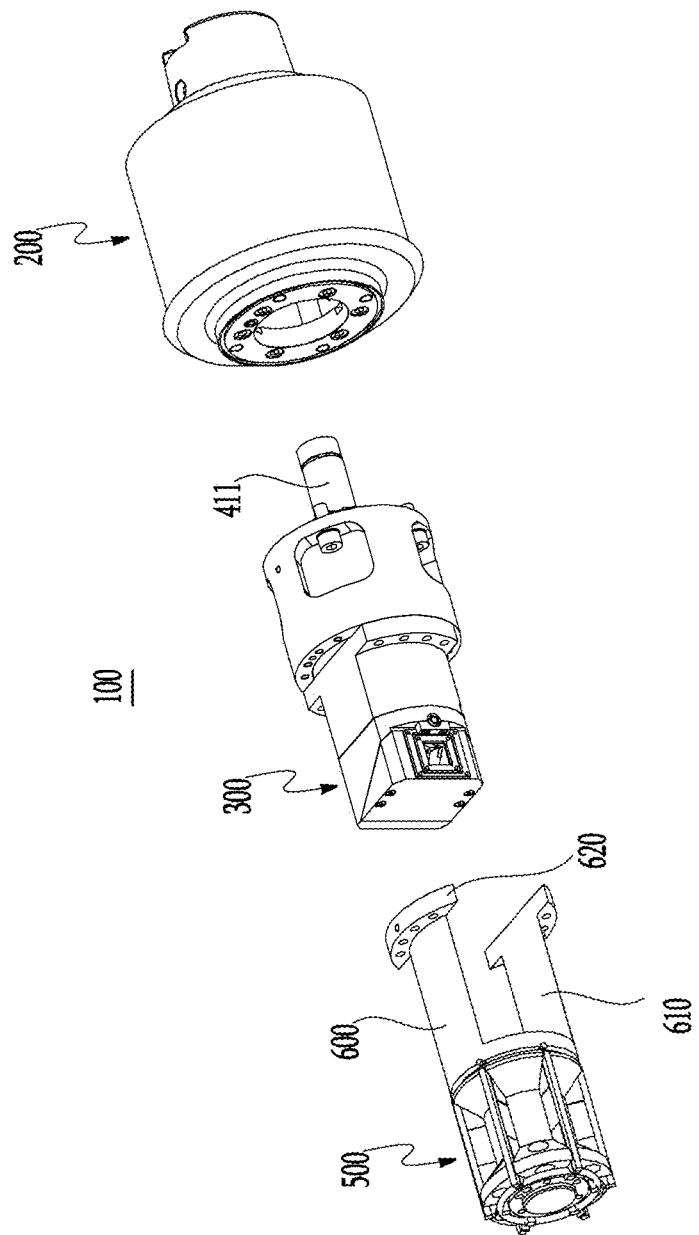
FIG. 12 is an exploded perspective view of a hybrid cutting apparatus according to a second exemplary embodiment of the present invention.
Figure 13:
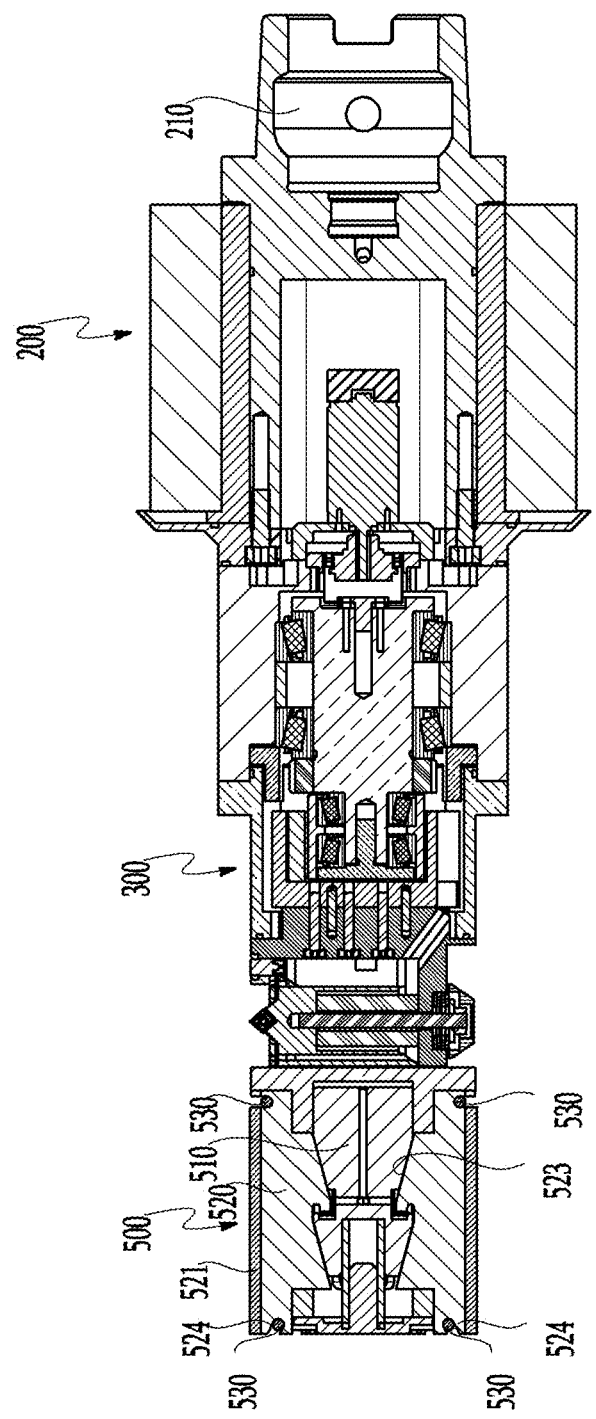
FIG. 13 is a vertical cross-sectional view as an assembled perspective view of a hybrid cutting apparatus according to a second exemplary embodiment of the present invention.
Figure 14:
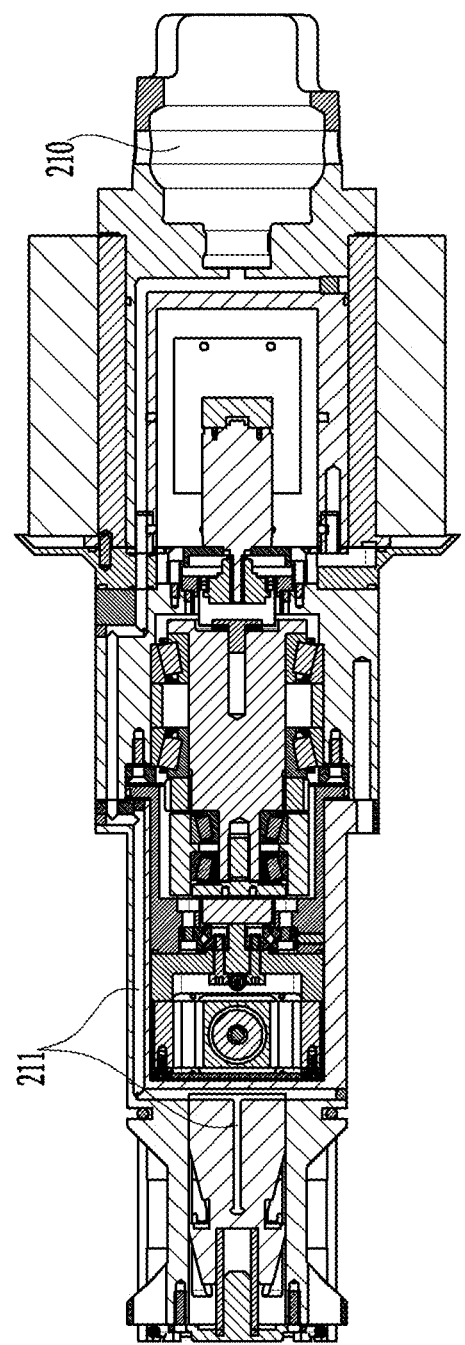
FIG. 14 is a horizontal cross-sectional view as an assembled perspective view of a hybrid cutting apparatus according to a second exemplary embodiment of the present invention.
Figure 15:
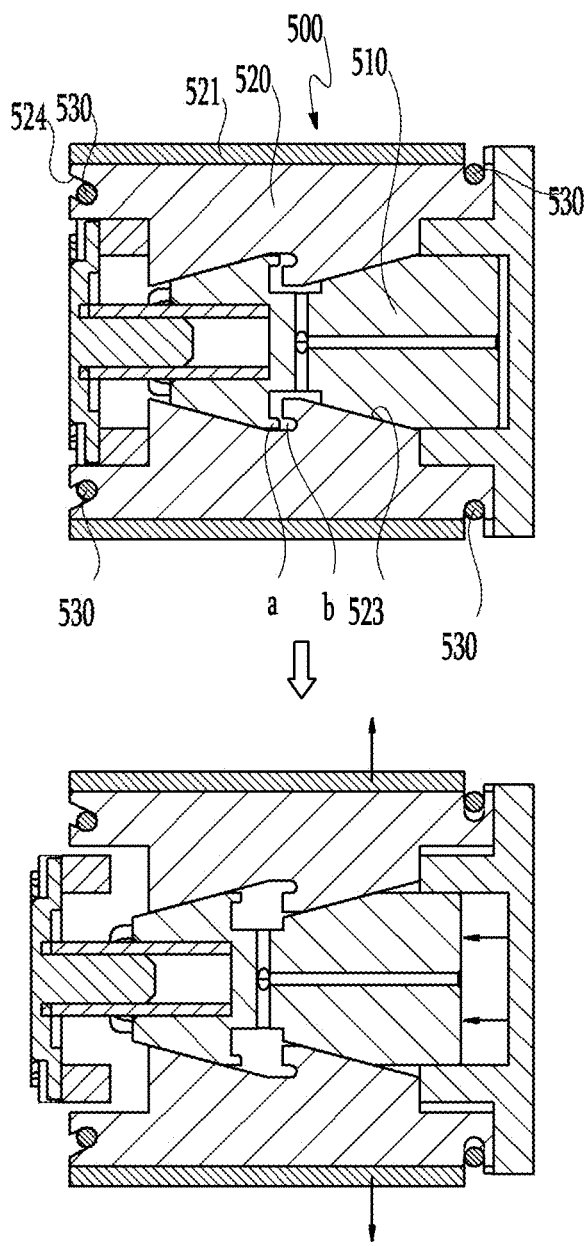
FIG. 15 is an operation state diagram of a honing tool.

FIG. 11 is a perspective view of a hybrid cutting apparatus according to a second exemplary embodiment of the present invention, FIG. 12 is an exploded perspective view of a hybrid cutting apparatus according to a second exemplary embodiment of the present invention, FIG. 13 is a vertical cross-sectional view as an assembled perspective view of a hybrid cutting apparatus according to a second exemplary embodiment of the present invention, FIG. 14 is a horizontal cross-sectional view as an assembled perspective view of a hybrid cutting apparatus according to a second exemplary embodiment of the present invention, and FIG. 15 is an operation state diagram of a honing tool.

Referring to the above drawings, a hybrid cutting apparatus 100 according to a second exemplary embodiment of the present invention may include a main body 200, a grooving tool 300, a tool position control means 400, and a honing tool 500.

In the first exemplary embodiment, the main body 200, the grooving tool 300, and the tool position control means 400 have been described and therefore a detailed description thereof is omitted, and the honing tool 500 will be described in detail.

The honing tool 500 is a means for honing processing of an inner surface of the cylinder bore 1 and may be disposed at one side of the grooving tool 300 of the hybrid cutting apparatus 100 of the second exemplary embodiment. Referring to FIG. 11, the honing tool 500 may be disposed at the front side of the grooving tool 300 to be arranged in a line with the grooving tool 300.

Such a honing tool 500 may include a forward and backward shaft 510 that may move forward and backward in an axial direction and a plurality of grindstone holders 520 that are radially disposed at the outside of the forward and backward shaft 510 and in which a grindstone 521 is installed at an outer surface.

In this case, an external form of the forward and backward shaft 510 has a cone shape having an exterior diameter gradually decreasing as advancing to a front end portion, and an inner surface of the grindstone holder 520 that comes in close contact with the forward and backward shaft 510 has an inclined surface 523 corresponding to the corn shape. Here, the corn shape and the inclined surface may be formed in at least one in an axial direction.

An exterior diameter of the grindstone holder 520 may be adjusted to correspond to an interior diameter size of a workpiece according to a form of such a honing tool 500. That is, when a hydraulic pressure occurs from a hydraulic plunger 210 that is installed within the main body 200, and the forward and backward shaft 510 is moved forward by a hydraulic pressure along a hydraulic flow channel 211 of FIG. 14.

When the forward and backward shaft 510 moves forward by a hydraulic pressure, while a corn of the forward and backward shaft 510 slides along the inclined surface 523 of the grindstone holder 520, as shown in the lower drawing of FIG. 15, the corn pushes the grindstone holder 520 outward and thus the grindstone holder 520 is protruded outward. Therefore, when the workpiece has a large interior diameter, by enlarging the exterior diameter of the grindstone holder 520 to correspond to the large interior diameter, a smooth honing processing is available.

At the front end and the rear end of the grindstone holder 520, a spring hook 524 for fixing a ring spring 530 is provided. The ring spring 530 performs a function of elastically pressing the grindstone holder 520 in a direction of the forward and backward shaft 510.

When it is necessary to reduce an exterior diameter of the grindstone holder 520, such a ring spring 530 is used. That is, when reducing or blocking a hydraulic pressure amount of the hydraulic plunger 210, a forward movement force of the forward and backward shaft 510 is removed and thus a diameter of the grindstone holder 520 decreases while the grindstone holder 520 moves backward along a corn by an elastic pressing force of the ring spring 530.

At the forward and backward shaft 510 and a contact surface of the grindstone holder 520, a latch a and a counterpart latch b, which stop the forward and backward shaft 510 at a predetermined point when the forward and backward shaft 510 moves backward, may be formed, respectively. That is, when the forward and backward shaft 510 moves backward, the latch a of the forward and backward shaft 510 is latched to the counterpart latch b of the grindstone holder 520 and thus a counterpart latch b performs a function of a stopper that prevents the forward and backward shaft 510 from further moving backward.

The honing tool 500 and the grooving tool 300 are fastened to the front end of the main body 200 by a common housing 600. That is, the front side of the housing 600 covers the honing tool 500, at the rear end of the housing 600, an insertion space 610 that inserts the grooving tool 300 is provided and thus the grooving tool 300 is inserted thereto, and at the rear end of the housing 600, a flange 620 is provided that comes in close contact with the front end of the main body 200 and that is fastened by a bolt. Therefore, the honing tool 500 and the grooving tool 300 are integrally connected by one housing 600.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Simple changes and modifications of the present invention belong to the scope of the present invention and the detailed scope of the present invention will be apparent by the appended claims.

| - Description of symbols - | |
|---|---|
| 1: cylinder bore | g: groove |
| 100: hybrid cutting apparatus | 200: main body |
| 300: grooving tool | 310: tool support |
| 320: tool holder | 330: cutting tip |
| 400: tool position control means | 410: first moving unit |
| 411: driving motor | 412: cam member |
| 413: connection body | 414: distance sensor |
| 416: harmonic drive | 420: second moving unit |
| 500: honing tool | 510: forward and backward shaft |
| 520: grindstone holder | 530: ring spring |

The invention claimed is:

1. A hybrid cutting apparatus, comprising:
a main body that is connected with a rotation shaft of a machine tool;
a grooving tool that is coupled to one side of the main body and for forming a groove at an interior circumference of a workpiece; and
a tool position control means that controls a position of the grooving tool to correspond to a cutting surface position of the workpiece,
wherein the tool position control means comprises a moving unit that moves a grooving tool such that a cutting tip of the grooving tool arrives at a groove processing depth of the workpiece, and
wherein the tool position control means further comprises:
a distance sensor for measuring a distance between a cutting tip of the grooving tool and the workpiece cutting surface; and
a control unit that automatically controls a level in which the moving unit moves the grooving tool according to a value that is measured by the distance sensor.

2. The hybrid cutting apparatus of claim 1, wherein the moving unit comprises:
a driving motor; and
a cam member having one end that is concentrically connected with a shaft of the driving motor and the other end that is connected with the grooving tool to be eccentric from the shaft of the driving motor.

3. The hybrid cutting apparatus of claim 2, further comprising a harmonic drive that is installed between the driving motor and the cam member to decelerate rotation power that is transferred from the driving motor to the cam member.

4. The hybrid cutting apparatus of claim 1, wherein the moving unit comprises a piezo actuator.

5. The hybrid cutting apparatus of claim 1, wherein the distance sensor detects a tilt of the rotation shaft.

6. The hybrid cutting apparatus of claim 1, wherein the moving unit comprises:
a first moving unit that moves a cutting tip of the grooving tool from a current position to a primary setting position adjacent to the workpiece; and
a second moving unit that moves the cutting tip of the grooving tool from the primary setting position to a processing depth of the groove.

7. The hybrid cutting apparatus of claim 1, further comprising a honing tool that is disposed at one side of the grooving tool and for a honing processing of an interior circumference of the workpiece.

8. The hybrid cutting apparatus of claim 7, wherein the honing tool is connected in a line with the grooving tool and is fastened to the main body together with the grooving tool by a common housing.

9. The hybrid cutting apparatus of claim 7, wherein the honing tool comprises:
a forward and backward shaft that is installed to perform a forward and backward movement in an axial direction;
a grindstone holder that is radially disposed at the outside of the forward and backward shaft and that is disposed to elastically press toward the forward and backward shaft by a ring spring; and
a grindstone that is installed at an outer surface of the grindstone holder.

10. The hybrid cutting apparatus of claim 9, wherein
the forward and backward shaft is formed in a cone shape having an exterior diameter gradually decreasing as advancing to the front end, and
an inner surface that comes in close contact with the forward and backward shaft of the grindstone holder has an inclined surface corresponding to the cone shape.

11. The hybrid cutting apparatus of claim 9, wherein the forward and backward shaft is moved by hydraulic pressure of a hydraulic plunger that is provided within the main body.

12. The hybrid cutting apparatus of claim 11, wherein the forward and backward shaft moves backward by an elastic pressing force of the ring spring, when hydraulic pressure of the hydraulic plunger is reduced or blocked.

13. The hybrid cutting apparatus of claim 9, wherein a latch and a counterpart latch for enabling the forward and backward shaft to stop at a predetermined point when the forward and backward shaft is moved backward are formed at the forward and backward shaft and a contact surface of the grindstone holder, respectively.

14. A method of cutting a groove at a cylinder bore surface using the hybrid cutting apparatus, the hybrid cutting apparatus comprising: a main body that is connected with a rotation shaft of a machine tool; a grooving tool that is coupled to one side of the main body and for forming a Groove at an interior circumference of a workpiece; and a tool position control means that controls a position of the grooving tool to correspond to a cutting surface position of the workpiece, the method comprising:
  installing the grooving tool within a cylinder bore;
  measuring a distance between a cutting tip of the grooving tool and the cylinder bore;
  setting a moving position of the grooving tool in proportion to the measured distance and moving the grooving tool to the predetermined moving position; and
  processing a groove in the cylinder bore by the grooving tool by rotating the hybrid cutting apparatus.

15. The method of claim 14, wherein the setting of a moving position comprises:
  a primary moving step of moving the grooving tool to a primary setting position adjacent to the cylinder bore; and
  a secondary moving step of moving the cutting tip of the grooving tool from the primary setting position to a processing depth of the groove.

16. The method of claim 14, further comprising: before the processing of a groove, deriving an optimal processing result value according to a condition value for processing the groove to reflect the processing result value to the processing of a groove.

17. The method of claim 14, further comprising: before the setting of a moving position, adjusting a position of a rotation central axis, when the rotation central axis of the cutting apparatus is inclined.

* * * * *

UNITED STATES PATENT AND TRADEMARK OFFICE
CERTIFICATE OF CORRECTION

PATENT NO. : 10,391,564 B2  
APPLICATION NO. : 15/573991  
DATED : August 27, 2019  
INVENTOR(S) : Jong-Kweon Park et al.

Page 1 of 1

It is certified that error appears in the above-identified patent and that said Letters Patent is hereby corrected as shown below:

On the Title Page

In Item (73) Assignee, "KOREA INSTITUTE OF MACHINERY & MATERIALS, Daejeon (KR)" should be amended --KOREA INSTITUTE OF MACHINERY & MATERIALS, Daejeon (KR); GOTTFRIED WILHELM LEIBNIZ UNIVERSITAT HANNOVER, Hannover (DE)--

Signed and Sealed this  
Twenty-eighth Day of January, 2020

Andrei Iancu  
*Director of the United States Patent and Trademark Office*